(12) United States Patent
Kim (10) Patent No.: US 10,510,262 B1
(45) Date of Patent: Dec. 17, 2019

(54) POST GUARD INTEGRATED MANAGEMENT SYSTEM AND POST GUARD INTEGRATED MANAGEMENT METHOD THEREOF

(71) Applicant: Yong Rok Kim, Jeollanam-do (KR)

(72) Inventor: Yong Rok Kim, Jeollanam-do (KR)

( * ) Notice: Subject to any disclaimer, the term of this patent is extended or adjusted under 35 U.S.C. 154(b) by 0 days.

(21) Appl. No.: 16/105,164

(22) Filed: Aug. 20, 2018

(51) Int. Cl.
| | |
|---|---|
| *G01B 21/16* | (2006.01) |
| *G08G 9/02* | (2006.01) |
| *G01L 5/00* | (2006.01) |
| *B66F 17/00* | (2006.01) |
| *H04W 4/38* | (2018.01) |
| *G01S 11/06* | (2006.01) |
| *G08B 17/00* | (2006.01) |
| *E04F 13/073* | (2006.01) |
| *H04W 4/33* | (2018.01) |
| *H04W 4/80* | (2018.01) |

(52) U.S. Cl.
CPC ............ *G08G 9/02* (2013.01); *B66F 17/003* (2013.01); *E04F 13/073* (2013.01); *G01L 5/0052* (2013.01); *G01S 11/06* (2013.01); *G08B 17/00* (2013.01); *H04W 4/33* (2018.02); *H04W 4/38* (2018.02); *H04W 4/80* (2018.02)

(58) Field of Classification Search
CPC ......... G08G 9/02; G01S 17/93; G01L 5/0052; G01P 15/001; B65G 2207/28
See application file for complete search history.

(56) References Cited

U.S. PATENT DOCUMENTS

| | | | | |
|---|---|---|---|---|
| 2005/0224427 | A1* | 10/2005 | Hatanaka | ............... A47B 53/02 211/1.51 |
| 2014/0361883 | A1* | 12/2014 | Ryan | ...................... G01S 17/93 340/436 |
| 2018/0116401 | A1* | 5/2018 | Kim | ..................... A47B 96/145 |

* cited by examiner

*Primary Examiner* — Hongmin Fan
(74) *Attorney, Agent, or Firm* — IPLA P.A.; James E. Bame (57) ABSTRACT

A post guard integrated management system includes a post guard having an embedded integrated module and installed in a building, and when a collision accident occurs or a fire accident occurs in the post guard, and notifies a manager or an operator of the status and risk of the accident, and a post guard integrated management method thereof. The post guard integrated management system includes a post guard installed in a pillar of a rack and having a sensor to transmit a change in tilt and presence or absence of collision along with position information; and a management server configured to monitor presence or absence of collision and a dangerous condition of the rack or the post guard based on the transmitted presence or absence of collision and dangerous condition of the rack or the post guard and provide detected status information of all post guards to receiving terminals.

11 Claims, 10 Drawing Sheets

POST GUARD INTEGRATED MANAGEMENT SYSTEM AND POST GUARD INTEGRATED MANAGEMENT METHOD THEREOF

BACKGROUND

The present invention relates to a post guard integrated management system, and more particularly, to a post guard integrated management system which includes a post guard having an embedded integrated module and installed in a building, and when a collision accident occurs or a fire accident occurs in the post guard, and notifies a manager or an operator of the status and risk of the accident, and a post guard integrated management method thereof.

Recently, with the growth of the logistics industry, demand for modern large-sized logistics centers is increasing due to increase in demand for logistics warehouses and the high-grade service such as day-to-day delivery. In order to increase the space utilization of logistics centers, installation of racks is also increasing to allow maximum storage in a logistic warehouse. However, safety accidents due to rack breakage are also increasing. Particularly, collision between a rack and various logistic facilities (transport equipment, such as forklifts, lorries, and the like) may lead to secondary accidents due to cargo collapse, occasionally resulting in personal injury.

To avoid such problems, a rack anti-collision device is installed along the movement path of the transport equipment on the bottom of the logistics warehouse. However, since the rack anti-collision device is installed in the movement path of the transport equipment, it occupies a separate space in a narrow logistics warehouse, thereby lowering the spatial efficiency. Therefore, it is predicted that the installation rate will be higher than the current one if a rack anti-collision device is developed, which notifies the manager immediately when the rack is in a dangerous condition without occupying the space of the logistics warehouse.

SUMMARY OF THE INVENTION

Objects of the present invention are to substantially solve at least the above problems and/or disadvantages and to provide at least the advantages below. Accordingly, an object of the present invention is to provide a post guard integrated management system which includes a post guard installed in a building and having an integrated module that is powered through wireless charging and a sensor and, when a collision accident or a fire accident occurs in the post guard, notifies a manager or an operator of the status and risk of the accident and collision strength in real time and provides element data related with the accident, and a post guard integrated management method thereof.

Another object of the present invention is to provide a post guard integrated management system which includes a post guard installed in a building and having an integrated module, checks a position of the post guard through an application installed in a manager terminal and, when an accident or fire occurs in the post guard, notifies a manager or an operator of the status and risk of the accident, and a post guard integrated management method thereof.

According to an aspect of the present invention, a post guard integrated management system includes a post guard installed in a pillar of a rack and having a sensor to transmit a change in tilt and presence or absence of collision along with position information; and a management server configured to monitor presence or absence of collision and a dangerous condition of the rack or the post guard based on the transmitted presence or absence of collision and dangerous condition of the rack or the post guard and provide detected status information of all post guards to a plurality of receiving terminals.

In addition, the post guard may include a body fixed to a portion of the pillar of the rack and having a predetermined width and height; a fire detection sensor configured to detect whether fire occurs; a tilt sensor configured to detect a change in tilt position of the post guard; an impact sensor configured to detect presence or absence of impact applied to the post guard; a wireless communication module configured to output a wireless communication signal including position information of the post guard; and a transmission unit configured to transmit tilt, impact, and position information input from the tilt sensor, the impact sensor, and the wireless communication module in real time.

In addition, the management server may receive and monitor connection statuses of all receiving terminals connected thereto through WiFi and information of the receiving terminals (terminal ID, terminal position, or the like), and the status information of the post guard transferred through the receiving terminal, and transmit relevant event information to the receiving terminal immediately when an event signal occurs in a particular post guard.

In addition, the post guard includes an embedded wireless charging module, and a plurality of wireless charging devices are installed in the inside wall of a building at uniform intervals. Therefore, battery replacement or power connection via wires is not necessary.

According to another aspect of the present invention, a post guard integrated management method includes (A) receiving a change in tilt and presence or absence of collision along with position information detected by an embedded sensor from a post guard installed in a pillar of a rack; and (B) monitoring presence or absence of collision and a dangerous condition of the rack or the post guard based on the transmitted presence or absence of collision and dangerous condition of the rack or the post guard and provide detected status information of all post guards to a plurality of receiving terminals. The step (A) further includes transmitting information indicating whether fire occurs, detected by a fire detection sensor in real time. In addition, with respect to the change in tile in the step (A), using the acceleration sensor data of X axis, Y axis, and Z axis measured by the tilt sensor as a use reference signal, it may be possible to generate a reference signal n' corresponding to acceleration sensor data and cancel a noise from a measured signal through a normalized-least-mean-squares algorithm that is a weight-update algorithm of an adaptive filter.

In addition, with respect to the presence or absence of collision and the dangerous condition, it may be possible to sample a vibration signal which has been amplified and filtered according to at least two criteria, and perform conversion into a digital signal with 16-bit quantization rate to output a resulted signal.

The step (A) may further include receiving receive a wireless communication signal from wireless communication modules physically adjacent thereto within a receivable range through a transmitting unit, and transmit the tilt, the impact, and the position information input from the wireless communication modules in real time.

The step (B) may further include receiving connection statuses of all receiving terminals connected thereto through WiFi and information of the receiving terminals (terminal ID, terminal position, or the like), receiving and monitoring status information of the post guard transferred from the receiving terminals, and transmitting relevant event information to the receiving terminal immediately when an event signal occurs in a particular post guard.

In addition, the post guard integrated management method may further include receiving, by receiving terminal, the information transmitted from the post guard, displaying the presence or absence of collision and dangerous condition of the post guard on a screen thereof, and transferring the presence or absence of collision and dangerous condition of the post guard to the management server.

In addition, the presence or absence of collision with of the post guard and the dangerous condition may be displayed on a logistics warehouse map stored in the receiving terminal on the screen of the receiving terminal.

According to the present invention as described above, the post guard integrated management system and the method thereof provide a post guard having an embedded sensor and transmit the presence or absence of collision and the dangerous condition in a workplace in real time, thereby enabling a manager to perform immediate safety action, and therefore preventing safety accidents. Accordingly, it is possible to prevent non-recognition of industrial accidents, which is caused by external factors, such as surrounding circumstances or clothes, in advance, and reduce company's loss in material and spiritual compensation due to disaster.

In addition, it is possible to check a position of a post guard through an application installed in a manager terminal and, when an accident occurs, enables a manager or an operator to check the accident status and risk of the post guard rapidly.

In addition, a wireless charging device installed in an inner wall of a building is provided to supply power, in a wireless manner, to a wireless charging module embedded in the post guard, a tilt sensor that detects a change in tilt position, a wire detection sensor that detects whether fire occurs, an impact sensor that detects presence or absence of impact applied to the post guard, a wireless communication module that outputs a wireless communication signal including position information of the post guard; and a transmission unit that transmits tilt, impact, and position information input from the tilt sensor, the impact sensor, and the wireless communication module in real time, thereby improving management convenience.

DETAILED DESCRIPTION OF THE PREFERRED EMBODIMENTS

Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The above objects, features, and advantages will be described in detail with reference to the accompanying drawings and therefore, the technical ideas of the present invention can be easily practiced by a person with ordinary skill in the art to which the present invention pertains. Further, when it is determined that the detailed description of the known art related to the present invention may obscure the gist of the present invention, the detailed description thereof will be omitted. Throughout the drawings, like reference numerals refer to like or similar components.

Hereinafter, a post guard integrated management system and method according to preferable embodiments of the present invention will be described with reference to the drawings in detail.

Figure 1:
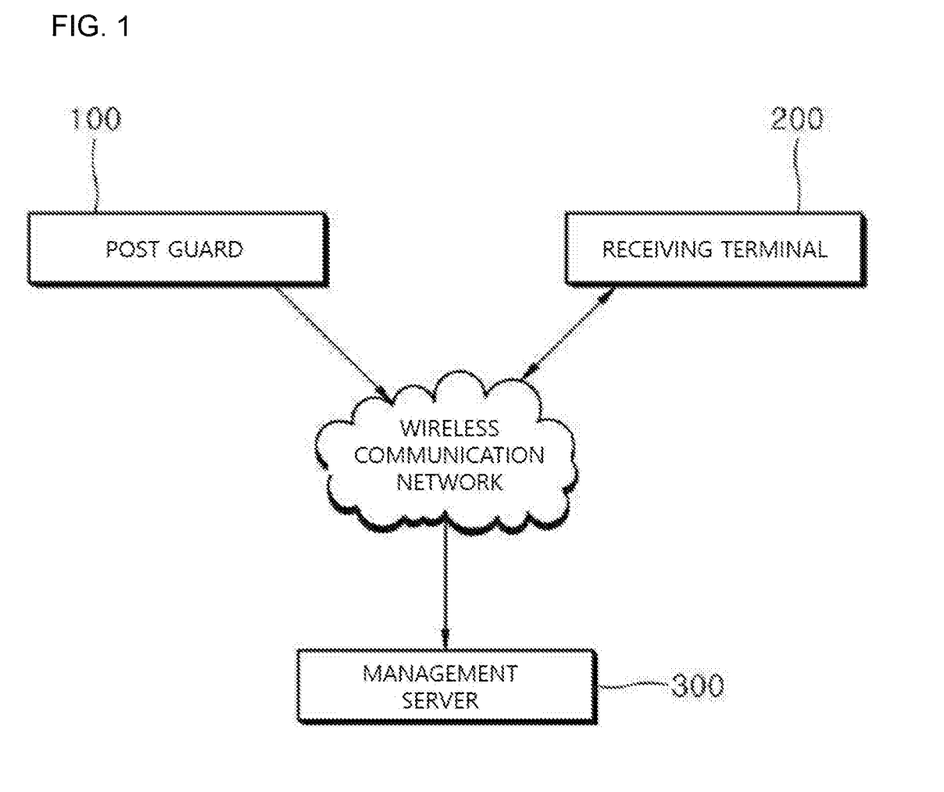
FIG. 1 is a block diagram illustrating a configuration of a post guard integrated management system according to an embodiment of the present invention.

FIG. 1 is a block diagram illustrating a configuration of a post guard integrated management system according to an embodiment of the present invention. The post guard integrated management system illustrated in FIG. 1 is an embodiment of the present invention and components thereof are not limited to the embodiment illustrated in FIG. 1. If necessary, some components may be added, changed, or removed.

As illustrated in FIG. 1, the post guard integrated management apparatus of the present invention includes a post guard 100, a receiving terminal 200, and a management server 300. In this case, data communication among the post guard 100, the receiving terminal 200, and the management server 300 may be performed through wireless communication networks including WiFi or Bluetooth or a wired LAN. However, the present invention is not limited thereto. The wireless communication networks may include a wireless LAN (WLAN), a wireless broadband (Wibro), a World Interoperability for Microwave Access (WIMAX), a High Speed Downlink Packet Access (HSDPA), Long Term Evolution (LTE), IEEE 802.16, and Wireless Mobile Broadband Service (WMBS). In addition, the short-range wireless communication networks may include beacon, Bluetooth, Radio Frequency Identification (RFID), Infrared Data Association (IrDA), Ultra Wideband (UWB), ZigBee, and Z-Wave.

The post guard 100 is installed on a pillar of a rack, and includes a sensor attached thereto and transmits information about a change in tilt and the presence or absence of collision along with position information to at least one of the receiving terminal 200 and the management server 300 in real time.

Figure 2:
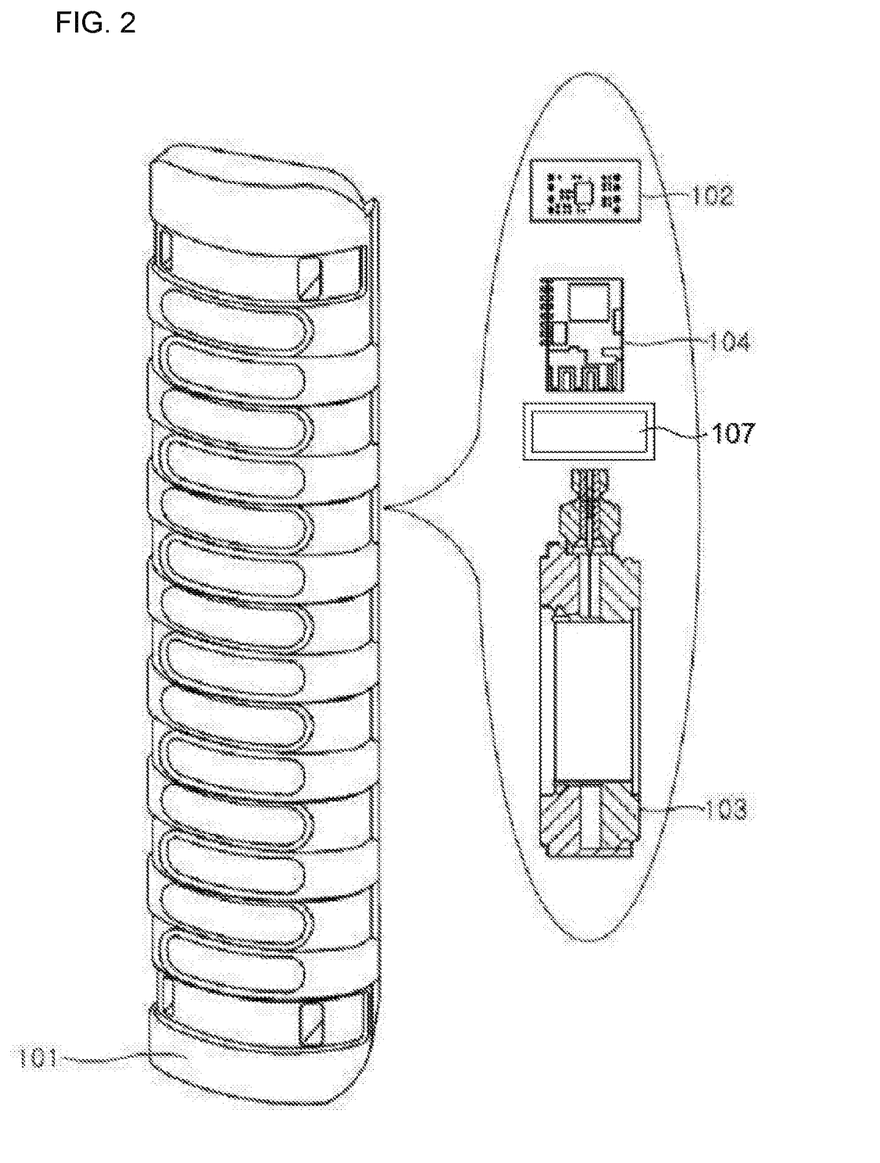
FIG. 2 is a configuration diagram illustrating a configuration of the post guard in FIG. 1 in detail.
Figure 3:
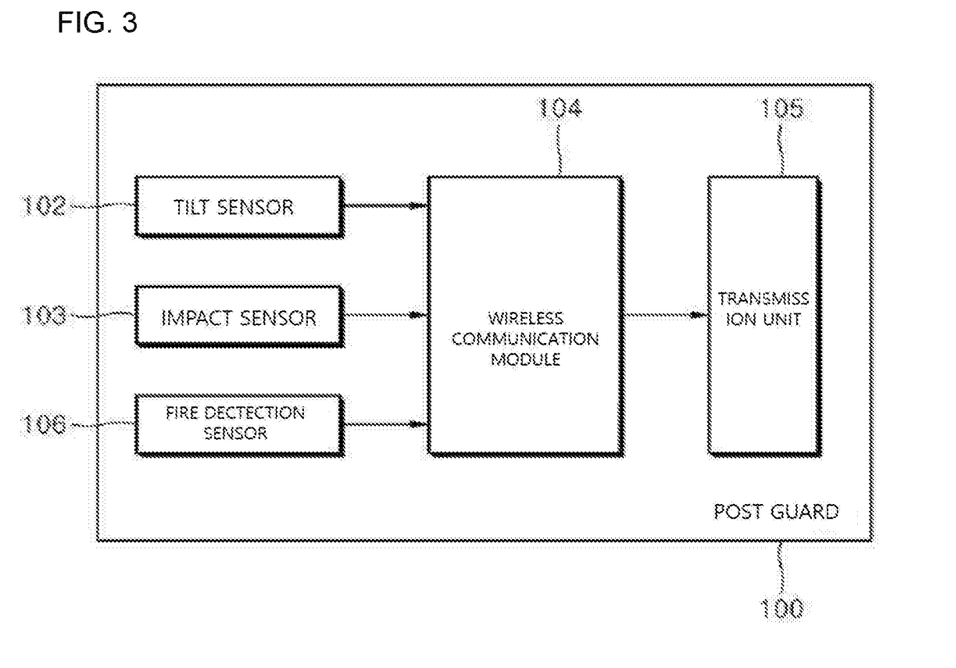
FIG. 3 is a configuration diagram in detail illustrating a configuration of a transmission unit that receives a wireless communication signal from a wireless communication module in FIG. 1.

FIG. 2 is a configuration diagram illustrating a configuration of the post guard in FIG. 1 in detail and FIG. 3 is a block diagram illustrating the configuration of the post guard in FIG. 1.

As illustrated in FIGS. 2 and 3, the post guard 100 may be fixed to a portion of the pillar of the rack and includes a half-tube shaped body 101 which is hollow and has a predetermined width and height, a tilt sensor 102, an impact sensor 103, a wireless communication module 104, and a transmission unit 105. In this case, the post guard 100 may further include a fire detection sensor 106 configured to detect whether fire occurs. In addition, the tilt sensor 102, the impact sensor 103, the wireless communication module 104, a wireless charging module 107, and the fire detection sensor 106 may be embedded in and positioned inside the body 101. However, the present invention is not limited thereto, and if necessary, the tilt sensor 102, the impact sensor 103, the wireless communication module 104, the wireless charging module 107, and the fire detection sensor 106 may be positioned outside the body 101.

The tilt sensor 102 checks a change in tilt of the rack or the post guard 100 after a transport equipment, such as forklifts, bogies, power lifts collides with the rack or the body 101 installed in the rack and detects a change in tilt position. In this case, the tilt sensor 102 may be configured by a Gyro sensor. Also, the tilt sensor 102 may measure a risk degree through comparison with a risk degree standard table in which tilts are previously stored, based on the change in tilt position. However, the present invention is not limited thereto, and measurement of a risk degree of the tilt using the risk degree standard table may be performed in such a way that the management server 200 receives the change in tilt position detected by the tilt sensor 102 and compares the received the change in tilt position with the risk degree standard table to measure the risk degree.

On the other hand, the tilt sensor 102 measures the change in tilt position measured for measurement of the risk degree through a Gyro sensor algorithm.

Figure 4:
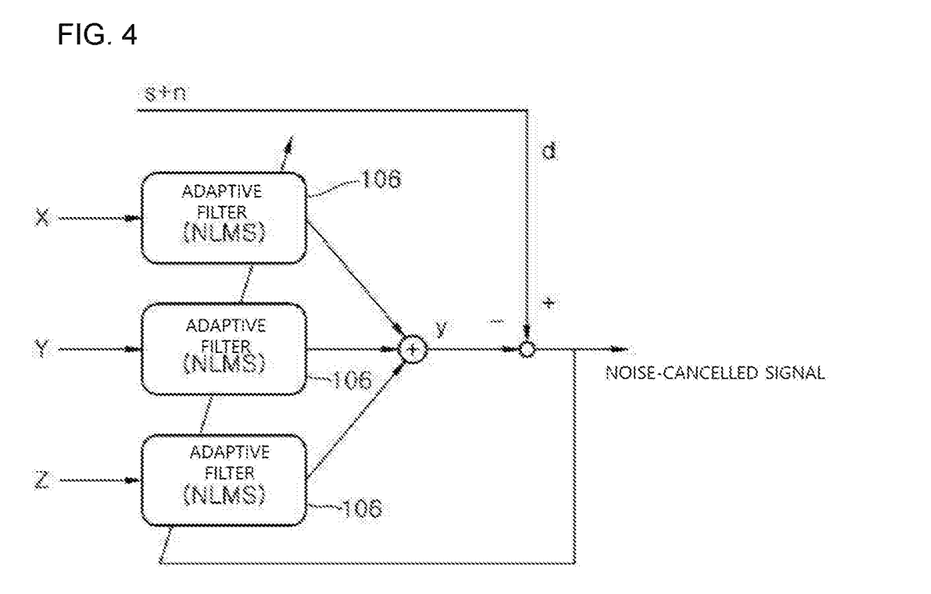
FIG. 4 is a configuration diagram illustrating a configuration for generating a reference signal for active noise cancellation in the tilt sensor in FIG. 3.

FIG. 4 is a configuration diagram illustrating a configuration for generating a reference signal for active noise cancellation in the tilt sensor of FIG. 3.

As illustrated in FIG. 4, in a case where there is noise n in a measured signal d with respect to an original signal d, when a reference signal n' has a low correlation relationship with an original signal s and a high correlation relationship with the noise n, only the noise n of the signal d is effectively reduced, thereby obtaining the original signal S alone. Therefore, in the case of using an active noise elimination technique, it is important to generate a reference signal n' having a low correlation relationship with an original signal s and a high correlation relationship with a noise n.

To this end, using acceleration sensor data of X axis, Y axis, and Z axis measured by the tilt sensor 102 as a use reference signal, a reference signal n' corresponding to the acceleration sensor data is generated through NLMS (normalized-least-mean-squares) algorithm that is a weight update algorithm of the adaptation filter 106. In this way, the tilt sensor 102 is used to measure a risk degree of collapse of the rack through detection of the tilt of the rack or the post guard 100 after the collision of the transport equipment.

The impact sensor 103 detects presence or absence of impact on the rack or the post guard 100 after a transport equipment, such as forklifts, bogies, power lifts collides with the body 101 collides with the rack or the body 101 of the post guard 100 installed in the rack. In this case, the impact sensor 103 may be configured by a Piezo sensor. On the other hand, the impact sensor 103 may detect whether impact occurs not measure the strength of the impact. The impact sensor 103 is configured using the piezoelectric film LDTM-028K and the operation amplifier TL084 for amplification. A vibration signal which has been amplified and filtered is sampled according to various criterion (for example, 1000 sample/sec) using the data gathering device DAQPad-6015, and is then converted into a digital signal with 16-bit quantization rate and outputted. As described above, the impact sensor 103 is used to detect the impact on the rack or the post guard 100 after the collision of the transport equipment and to notify the risk degree of collapse of the rack.

The fire detection sensor 106 detects where fire occurs in a logistics warehouse. In this case, the fire detection sensor 106 may be configured by a fire source detection sensor and a gas detection sensor, and examples thereof include a thermal sensor, a smoke detection sensor, and a sensor for detecting an infrared wavelength range of gas and light. On the other hand, a gas detection sensor is a sensor for performing detection before fire occurrence and a fire source detection sensor is a sensor for detecting fire occurrence. The fire detection sensor 106 is used to detect fire occurrence in a logistics warehouse and notify the risk of fire.

The wireless communication module 104 transmits a wireless communication signal including pieces of data, such as an installation position of the wireless communication module, whether impact (alert) occurs based on a change in a Received Signal Strength Indication (RSSI) signal, and the number of impacts (alerts) for a wireless communication module 104 for each position.

Therefore, the wireless communication module 104 is used to transmit a wireless communication signal including position information along with tilt information and impact information detected by the tilt sensor 102 and the impact sensor 103 to the transmission unit 105, thereby notifying a position of the post guard 100 which has collided with the transport equipment. Also, the wireless communication module 104 is used to transmit position information along with fire occurrence information detected by the fire detection sensor 106, thereby notifying a position where fire occurs in the logistics warehouse. In this case, the wireless communication module 104 is a Bluetooth Low Energy (BLE) wireless communication module and may be short-range wireless communication equipment operating based on Bluetooth 4.0 technology supporting low-energy Bluetooth. A wireless communication signal transmitted by the wireless communication module 104 is transmitted to the transmission unit 105 through WiFi or Bluetooth.

The transmission unit 105 may be provided in plural, and the plurality of transmission unit 105 receive wireless communication signals from the wireless communication modules 104 physically adjacent thereto and transmit them to the management server 200 or the receiving terminal 300. In this case, transmission may be performed through WiFi or Bluetooth. Also, the transmitted information includes position information of the wireless communication module 104 along with tilt information, impact information and fire occurrence information included in the wireless communication signal. Also, the transmission unit 105 is continuously connected to a power supply and may use a high-capacity battery module.

As described above, the transmission unit 105 uses "Cricket system" that is an on-demand management technique in order to resolve the problem of interference and collision of wireless communication signals and reduce an error rate of an ultrasonic signal.

Figure 5:
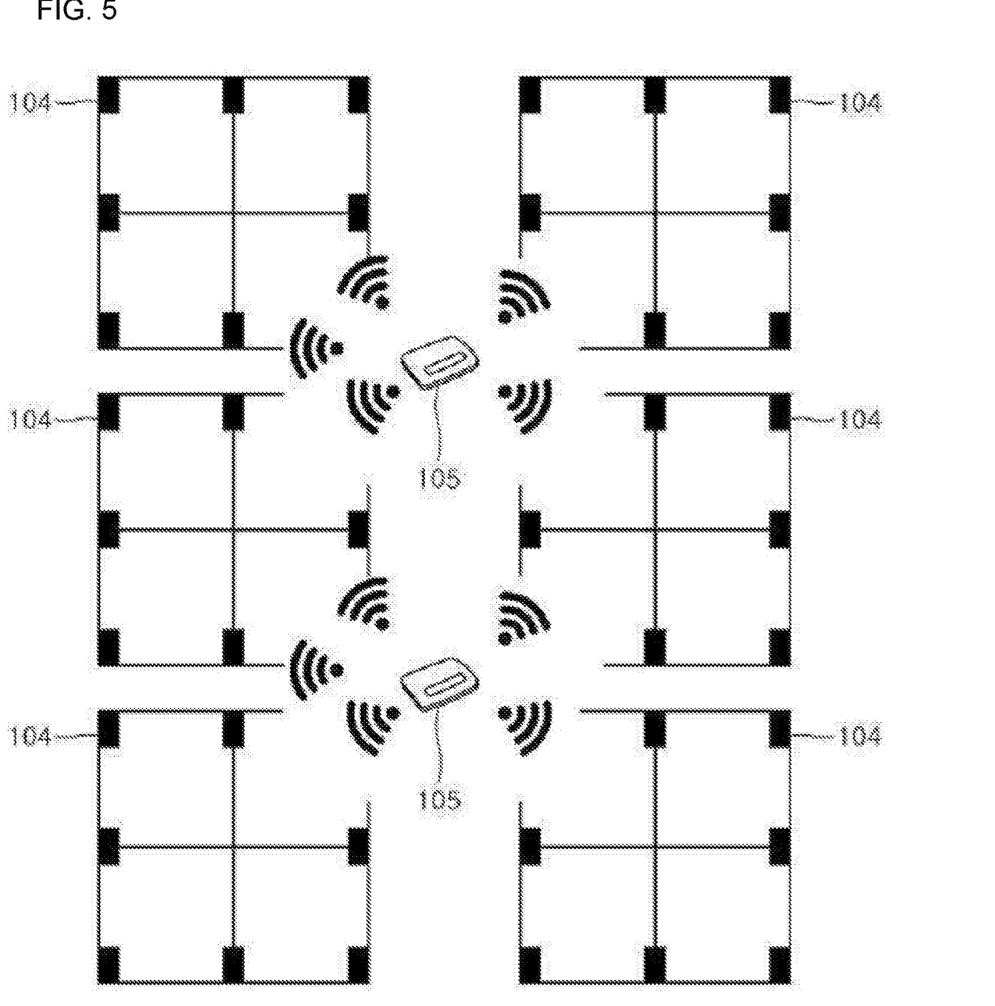
FIG. 5 is a configuration diagram illustrating a configuration of a transmission unit for receiving wireless communication signals from wireless communication modules physically adjacent thereto in FIG. 3.

FIG. 5 is a configuration diagram illustrating a configuration of a transmission unit for receiving wireless communication signals from wireless communication modules physically adjacent thereto in FIG. 3.

As illustrated in FIG. 5, the transmission unit 105 receives wireless communication signals transmitted by some of the wireless communication modules 104 physically adjacent thereto, not by all of the wireless communication modules 104. In this case, a physically-adjacent wireless communication module 104 refers to a receivable range from a wireless communication module 104. However, the present invention is not limited thereto, and a manager or an operator may determine a certain range within the receivable range from a wireless communication module 104.

The croquet system is used as a representative distance measurement method in the indoor position recognition system by ensuring high accuracy of several centimeters level by using a difference in a propagation speed between a RF signal and an ultrasonic signal. However, RF signals and ultrasonic signals are affected by environment, such as temperature, humidity, and obstacles. Especially, since ultrasonic signals are low frequency signals, there is a disadvantage in that the propagation distance is short due to a lack of straightness of signals.

In this case, the problem caused by the characteristics of the ultrasonic signals can be overcome to some extent through the development of ultrasonic sensor technology and efficient node arrangement. However, disposing a plurality of wireless communication module nodes at narrow intervals in the indoor space ensures the accurate arrival of the ultrasonic signals, but causes interference of the wireless communication signal and increases failure probability of ultrasonic signal reception and a position calculation cycle. Since all of the wireless communication modules 104 periodically transmit a wireless communication signal, the transmission unit 105 may receive a signal from the wireless communication module 104 at a long distance, which increase the above-described problems.

In order to resolve the above problems, the present invention uses On-demand management technique of receiving wireless communication signals transmitted from the wireless communication modules 104 physically adjacent to the transmission unit 105.

The receiving terminal 200 is a smart-phone and is owned by a manager or an operator. A post guard integrated management application is installed in the receiving terminal 200 in order to receive information transmitted from the post guard 100 through a wireless communication network. The post guard integrated management application may be provided by the management server 300 or an application market for smart-phones (for example, Apple app store, Google android market, or the like) and be installed.

The post guard integrated management application installed in the receiving terminal 200 is performed by the operation of the manager or the operator. That is, the manager performs the application which is installed using a simple (touch or button) method of selecting the post guard integrated management application displayed on a display window (screen).

The receiving terminal 200 detects the statuses of all post guards 100 through the executed application. In addition, the receiving terminal 200 may automatically recognize an un-registered wireless communication module 104 in a standby mode, of which information is not registered. In this way, the receiving terminal 200 displays the presence or absence of collision and dangerous condition of the post guard 100 in a logistics warehouse on the screen of the receiving terminal 200 and transmits the indication to the management server 300.

Figure 6:
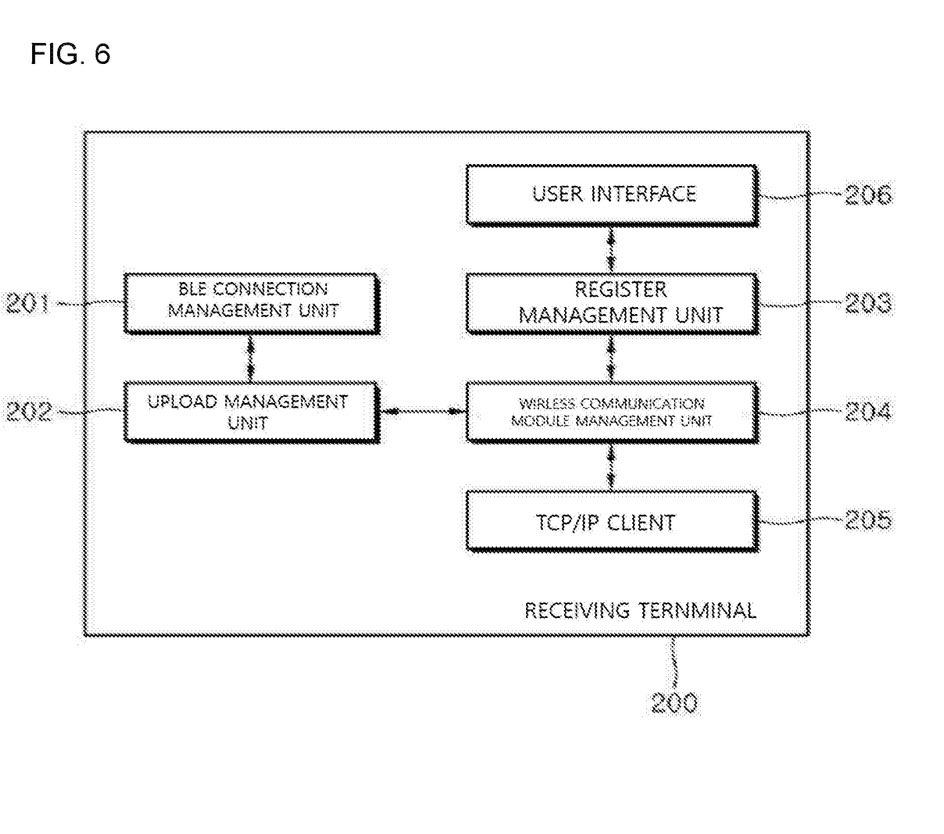
FIG. 6 is a configuration diagram illustrating a configuration of the post guard in FIG. 1 in detail.

FIG. 6 is a block diagram illustrating a configuration of the receiving terminal of FIG. 1 in detail. FIGS. 7A to 7D illustrate an embodiment of an application screen displayed on the screen of the receiving terminal in FIG. 1. As illustrated in FIG. 6, the receiving terminal 200 includes a BLE connection management unit 201 configured to connect the post guard 100 using a Bluetooth BLE profile, check whether status information is uploaded to the wireless communication module 104, and output a result of checking, a upload management unit 202 configured to receive an event through a user interface and upload status information registered in the wireless communication module 104 connected thereto through the BLE connection management unit 201, a register management unit 203 configured to register or delete post guard information based on information input via the user interface 206 and transfer the post guard information to a wireless communication module management unit 204, the wireless communication module management unit 204 configured to match status information of the wireless communication module 104 uploaded by the upload management unit 202 with the post guard information transferred from the register management unit 203 and manage the presence or absence of collision and the dangerous condition for each post guard 100, a TCP/IP client 205 configured to transfer the presence or absence of collision and the dangerous condition for each post guard 100, which are detected by the wireless communication module management unit 204, to the manager server 300 via TCP/IP communication, and a user interface 206 configured to display the presence or absence of collision and the dangerous condition for each post guard 100, which are detected by the wireless communication module management unit, on the screen of the receiving terminal 200 and receive an operation instruction event from the manager.

As described above, the receiving terminal 200 receives the wireless communication signal transmitted from the wireless communication module 104 and display, on the screen of the receiving terminal 200 or transfer, to the management server 300 through TCP/IP communication, tilt information and impact information included in the wireless communication signal, and the presence or absence of collision with the post guard 100 and the dangerous condition in a workspace corresponding to the position information of the wireless communication module 104.

In the case of displaying the presence or absence of collision with the post guard 100 and the dangerous condition on the screen of the receiving terminal 200, the receiving terminal 200 displays them on a map showing the logistics warehouse, stored in the receiving terminal 200, thereby enabling the manager or the operator to rapidly check the position of a post guard at which an accident occurs when the accident occurs.

Figure 7A:
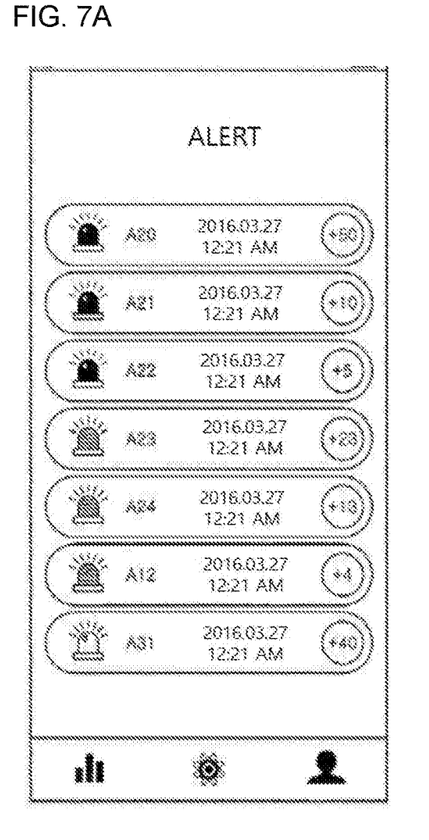
FIGS. 7A to 7D illustrate embodiments of application screens displayed on the screen of the receiving terminal of FIG. 1.

In an embodiment, as illustrated in FIG. 7A, the receiving terminal 200 displays one dangerous condition of Very Dangerous, Dangerous, Fine for each post guard 100 based on the wireless communication signal received from the wireless communication module 104.

In this case, the receiving terminal 200 may measure a risk degree according to the total numbers of impacts and a change in tilt using a previously-stored risk degree table based on tilt and impact. In addition, the receiving terminal 200 may display the measured risk degree. However, the present invention is not limited thereto and risk degree measurement may be performed by the tilt sensor 102 and the impact sensor 103. The risk degree may be transmitted to the receiving terminal 200 through a wireless communication signal. In this case, a standard risk table may be stored in the tilt sensor 102 and the impact sensor 103.

Figure 7B:
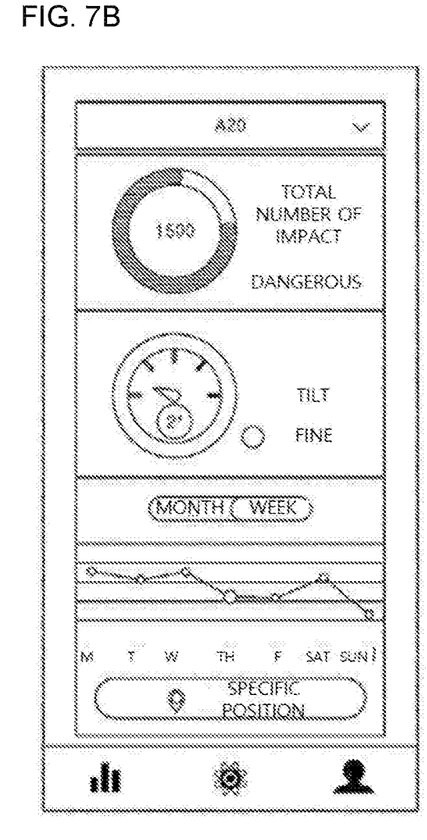

Also, as illustrated in FIG. 7B, the receiving terminal 200 may display the total numbers of impacts, the dates of occurrence of impacts, and a change in tilt with respect to A20 which is the post guard 100 selected by the manager, based on the wireless communication signal received from the wireless communication module 104. The receiving terminal 200 may display the dangerous condition of a selected post guard 100.

Figure 7C:
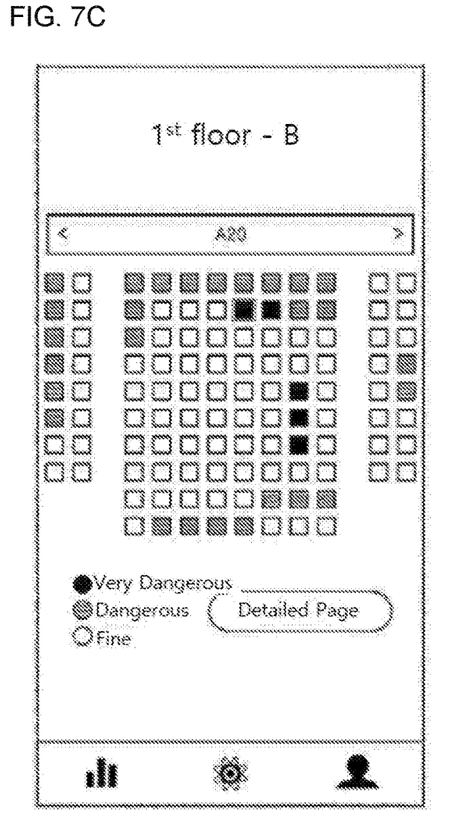

In addition, as illustrated in FIG. 7C, the receiving terminal 200 displays a dangerous condition of each post guard 100 on a map showing the logistics warehouse, based on the wireless communication signal received from the wireless communication module 104.

Figure 7D:
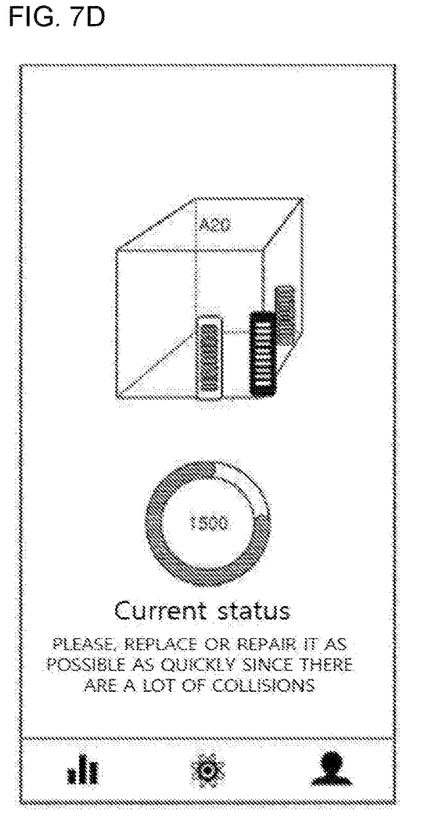

As illustrated in FIG. 7D, the receiving terminal 200 displays the current status of A20 which is the post guard 100 selected by the manager, based on the wireless communication signal received from the wireless communication module 104. In this case, the displayed current status may include a message indicating the number of collisions of a relevant post guard 100 and whether the post guard 100 is to be replaced. For example, there is displayed a message of "Please, replace or repair it as possible as quickly since there are a lot of collisions now"

The management server 300 has the same configuration as that of a typical web server in hardware and includes program modules implemented in various types of languages such as C++, Java, Visual Basic, or Visual C, and performing various functions in software. The management server 300 may be implemented using a web server program that is variously provided according to operating systems such as DOS, window, Linux, unix, and Macintosh, on general server hardware. For example, there are a website, and an Internet Information Server (IIS) used in a Windows environment, and CERN, NCSA, and APPACH used in a UNIX environment.

The management server 300 detects the statuses of all post guards 100 and the receiving terminal 200 according to input of the presence or absence of collision and dangerous condition of the rack or the post guard 100 transmitted from at least one of the post guard 100 and the receiving terminal 200. The management server 300 monitors the presence or absence of collision and dangerous condition of the rack or the post guard 100 in the logistics warehouse and the status information of the receiving terminal 200. Meanwhile, the management server 300 may provide detected status information of all post guards 100 to a plurality of receiving terminals 200.

In this case, the management server 300 receives and monitors the connection statuses of all receiving terminals 200 connected thereto through WiFi and information of the receiving terminals 200 (terminal ID, terminal position, or the like), and the status information of the post guard 100, using a network monitoring method with the receiving terminal 200. Therefore, the management server 300 may transmit relevant event information to the receiving terminal 200 immediately when an event signal, such as collision, occurs in a certain post guard 100.

Meanwhile, when there is movement of the post guard 100, the management server 300 analyzes and tracks a movement path of the post guard 100 based on a change in the Received Signal Strength Indicator (RSSI) of the receiving terminal 200 and position information of the receiving terminal 200 which are caused by movement of the post guard 100.

Figure 8:
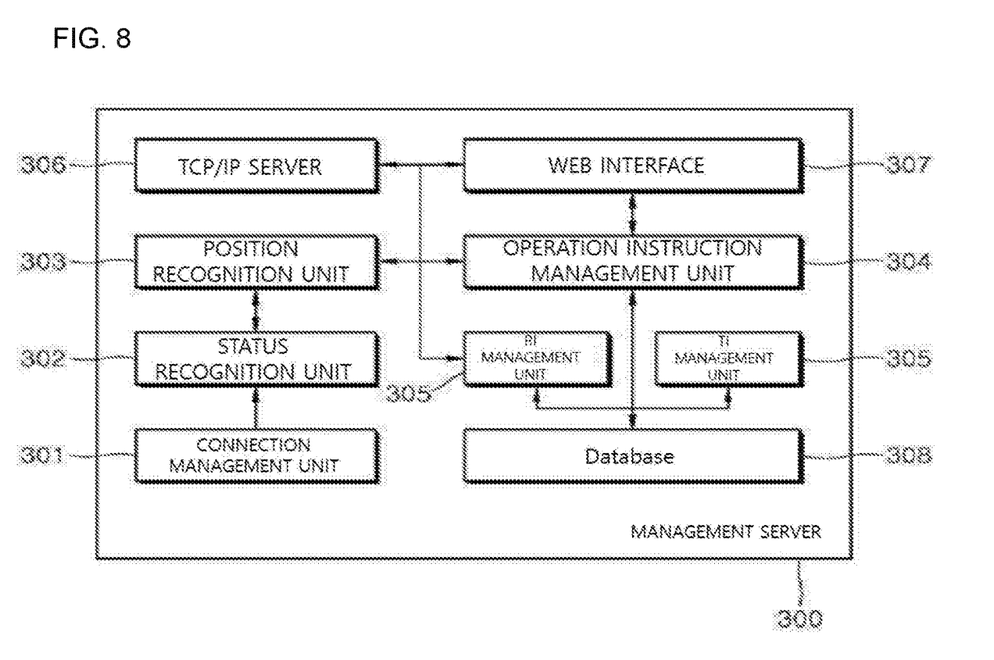
FIG. 8 is a block diagram illustrating a configuration of the management server in FIG. 1 in detail.

FIG. 8 is a block diagram illustrating a configuration of the management server in FIG. 1 in detail.

As illustrated in FIG. 8, the management server 300 includes a connection management unit 301 configured to manage network connections of a receiving terminal 200 connected thereto via WiFi or wired LAN and receive information about of the post guard 100 (post guard information) via the receiving terminal 200, a status recognition unit 302 configured to recognize statuses of the receiving terminal 200 and the post guard 100, such as movement, storage, operation, or the like, based on information received from the receiving terminal 200 and the post guard 100, a position recognition unit 303 configured to track a movement path of the receiving terminal 200 which is moving and the post guard 100 and recognize a current position based on information received from the receiving terminal 200 and the post guard 100, an operation instruction management unit 304 configured to receive an operation instruction event through the web interface 307 and perform monitoring for status recognition of a relevant operation and synchronization with database 308 using information recognized by the status recognition unit 302 and the position recognition unit 303, a TCP/IP server 306 configured to receive the presence or absence of collision and a dangerous condition for each post guard 100 which are input from the receiving terminal 200 via TCP/IP communication, or transfer the presence or absence of collision and a dangerous condition for each post guard 100 which is monitored by the operation instruction management unit 304 to the receiving terminal 200 via TCP/IP communication, an RI/TI management unit 305 configured to store and manage the presence or absence of collision and a dangerous condition for each post guard transferred from the TCP/IP server 306, and a web interface 307 configured to display, on the screen of the management server 300, the presence or absence of collision and a dangerous condition for each post guard 100 transferred from the TCP/IP server 306, and receive an operation instruction event from a manager.

As described above, the management server 300 may monitor the network statuses of all post guards 100 and the receiving terminal 200 and manage all kinds of information related to the logistics warehouse, such as an installation position, a current status, quantity of inventory, and the like.

An operation of the post guard integrated management system according to the present invention as configured as described above will be described below with reference to the accompanying drawings. The same reference numeral through FIG. 1 to FIG. 8 refers to the same component for performing the same function.

Figure 9:
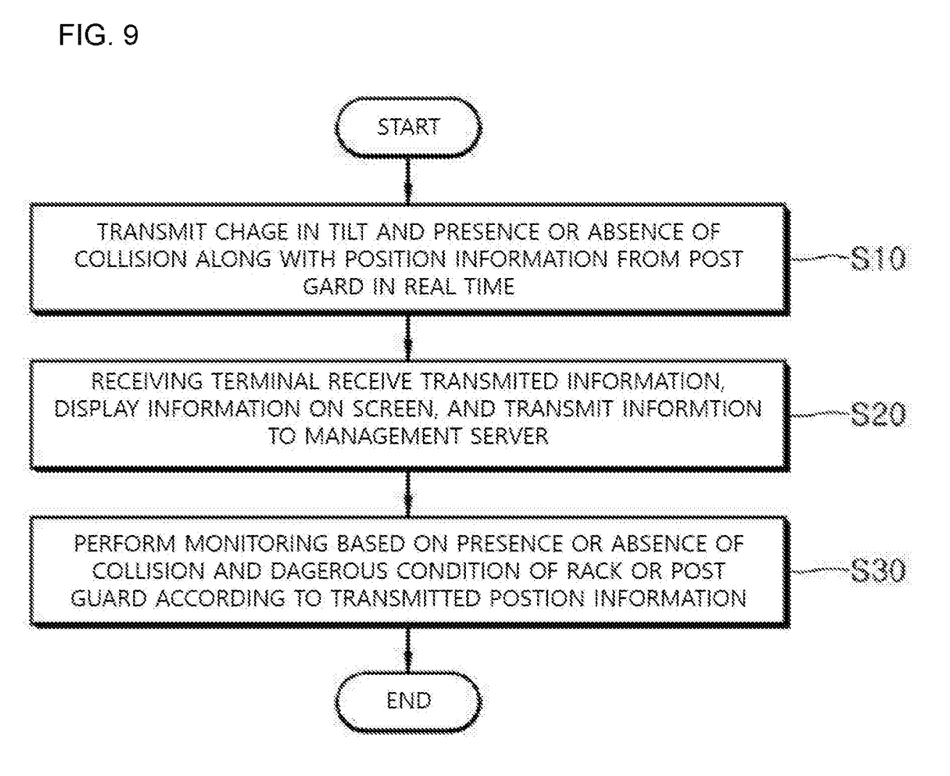
FIG. 9 is a flowchart for describing a post guard integrated management method according to an embodiment of the present invention.

FIG. 9 is a flowchart for describing a post guard integrated management method according to an embodiment of the present invention.

Referring to FIG. 9, first, the post guard 100 installed on a pillar of the rack transmits at least one of a change in tilt, which is detected by the tilt sensor 102 and the presence or absence of collision which is detected by the impact sensor 103, along with an (installation) position information output from an embedded communication module 104 in real time.

In this case, the post guard 100 receives only the wireless communication signal transmitted from the wireless communication module 104 physically adjacent to the transmission unit 105 and transmits position information and a change in tilt and the presence or absence of collision, which correspond to the received wireless communication signal, to the receiving terminal 200 and the management server 300. Therefore, the transmission unit 105 may be provided in plural. Also, the post guard 100 may further transmit information of whether fire occurs, which is detected through a fire detection sensor in addition to the position information and the change in tilt and the presence or absence of collision. The fire detection sensor 106 may include a fire source detection sensor and a gas detection sensor.

On the other hand, by using acceleration sensor data of X axis, Y axis, and Z axis measured by the tilt sensor 102 as a use reference signal, a reference signal n' corresponding to the acceleration sensor data is generated through the NLMS (normalized-least-mean-squares) algorithm that is a weight update algorithm of the adaptation filter 106.

The impact sensor 103 is configured using the piezoelectric film LDTM-028K and the operation amplifier TL084 for amplification and filtering. A vibration signal which has been amplified and filtered is sampled according to various criterion (for example, 1000 sample/sec) using the data gathering device DAQPad-6015, and is then converted into a digital signal with 16-bit quantization rate and outputted.

Subsequently, the receiving terminal 200 receives information transmitted from the post guard 100, displays the the presence or absence of collision and a dangerous condition of the post guard 100, and transmits relevant information to the management server. In this case, a post guard integrated management application is installed in the receiving terminal 200, and the receiving terminal 200 may display the presence or absence of collision with the post guard and the dangerous condition, on a map showing the logistics warehouse, stored in the receiving terminal, through execution of the post guard integrated management application. Therefore, it is possible to enable the manager or the operator to rapidly check the position of a post guard at which an accident occurs, when the accident occurs.

The management server 300 monitors the inside of the logistics warehouse based on the presence or absence of collision and a dangerous condition of the rack or the post guard 100 according to position information transmitted from at least one of the post guard 100 and the receiving terminal 200 (S30).

In this case, the management server 300 may provide detected status information of all post guards to a plurality of receiving terminals 200 again. That is, the management server 300 receives and monitors the connection statuses of all receiving terminals 200 connected thereto through WiFi and information of the receiving terminals 200 (terminal ID, terminal position, or the like), and the status information of the post guard 100 transferred through the receiving terminal. The management server 300 transmits relevant event information to the receiving terminal 200 immediately when an event signal occurs in a certain post guard 100.

When there is movement of the post guard 100, the management server 300 may analyze and track a movement path of the post guard 100 based on a change in a Received Signal Strength Indicator (RSSI) of the receiving terminal and position information of the receiving terminal which are caused by movement of the post guard.

Figure 10:
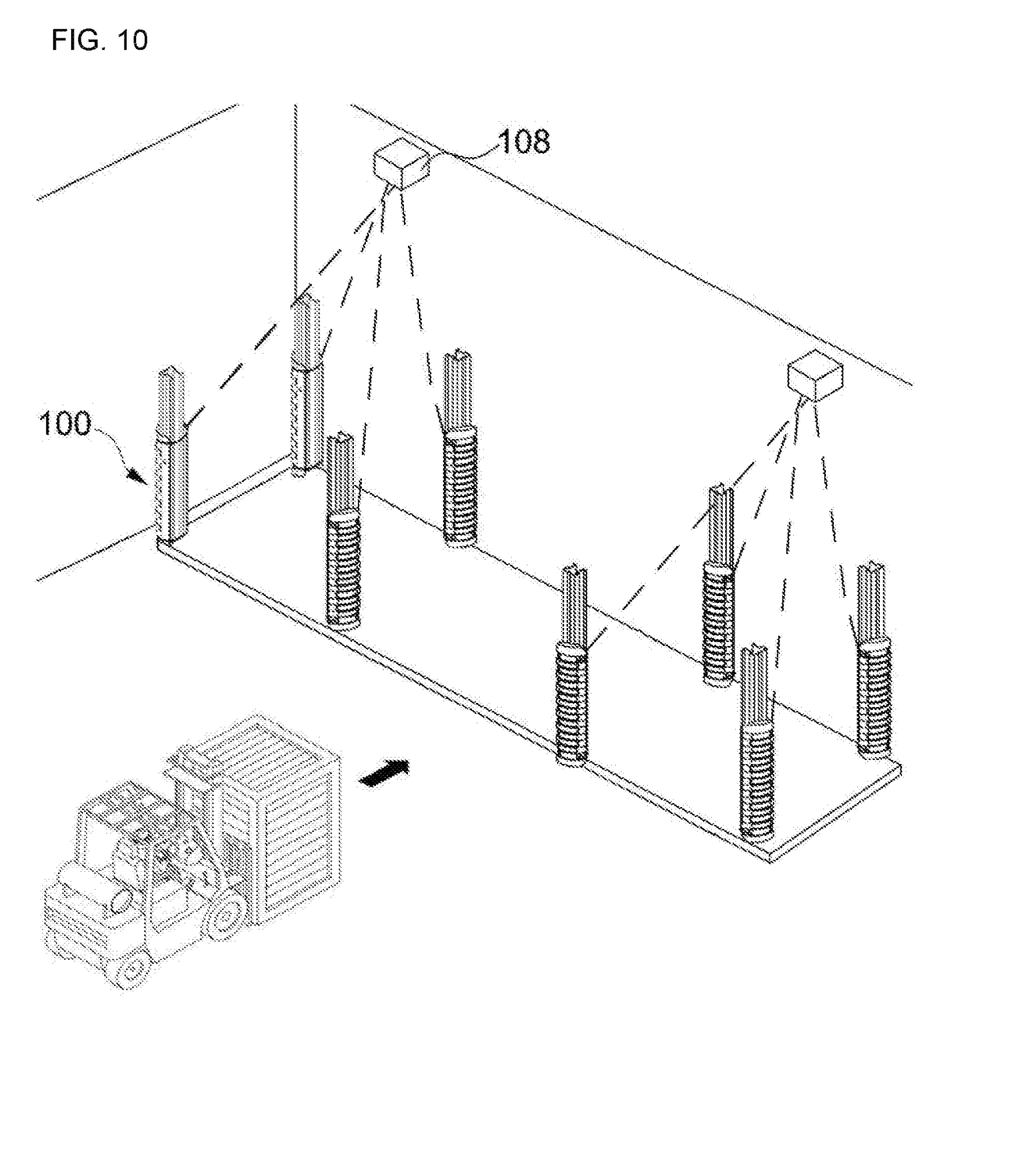
FIG. 10 is an example of wireless charging according to the present invention.

FIG. 10 illustrates an example of wireless charging, wherein a wireless charging device wire-connected to the ceiling or the inner wall of a building may be provided. The wireless charging device detects the position of a wireless charging module of a post guard which is to be powered in a wireless manner and supplies power by performing targeting using Infrared (IR) directly or indirectly or supplies power to a post guard to be charged. That is, the wireless charging device is configured to recognize the wireless charging module embedded in the post guard and, if needed, supply power. It is noted that the energy transfer distance of IR used in the wireless charging device is about 5 to 10 m and therefore, it is preferable to install a plurality of wireless charging devices at uniform intervals.

The present invention described above is not limited by the embodiments described above and the accompanying drawings, various changes and modifications are possible within the scope and spirit of the present invention is usually in the art in the knowledge it will be apparent to those.

What is claimed is:

1. A post guard integrated management system, comprising:
   a post guard installed in a pillar of a rack and having a sensor to transmit a change in tilt and presence or absence of collision along with position information; and
   a management server configured to monitor presence or absence of collision and a dangerous condition of the rack or the post guard based on the transmitted presence or absence of collision and dangerous condition of the rack or the post guard and provide detected status information of all post guards to a plurality of receiving terminals,
   wherein, when there is movement of the post guard, the management server analyzes and tracks a movement path of the post guard based on a change in a Received Signal Strength Indicator (RSSI) of a receiving terminal and position information of the receiving terminal which are caused by movement of the post guard.

2. The post guard integrated management system of claim 1, wherein the post guard includes:
   a body fixed to a portion of the pillar of the rack and having a predetermined width and height;
   a fire detection sensor configured to detect whether fire occurs;
   a tilt sensor configured to detect a change in tilt position of the post guard;
   an impact sensor configured to detect presence or absence of impact applied to the post guard;
   a wireless communication module configured to output a wireless communication signal including position information of the post guard; and
   a transmission unit configured to transmit tilt, impact, and position information input from the tilt sensor, the impact sensor, and the wireless communication module in real time, receive a wireless communication signal from wireless communication modules physically adjacent thereto within a receivable range, and transmit the tilt, the impact, and the position information input from the wireless communication modules in real time.

3. The post guard integrated management system of claim 1, further comprising:
   a wireless charging module embedded in the post guard; and
   a wireless charging device installed wire-connected to a ceiling or inner wall of a building to supply power by recognizing the wireless charging module.

4. The post guard integrated management system of claim 1, wherein the management server receives and monitors connection statuses of all receiving terminals connected thereto through WiFi and information of the receiving terminals (terminal ID, terminal position, or the like), and the status information of the post guard transferred through the receiving terminal, and transmits relevant event information to the receiving terminal immediately when an event signal occurs in a particular post guard.

5. The post guard integrated management system of claim 1, wherein the management server includes:
   a connection management unit configured to manage network connections of a receiving terminal connected thereto via WiFi or wired LAN and receive information about of the post guard via the receiving terminal;
   a status recognition unit configured to recognize statuses of the receiving terminal and the post guard which include movement, storage, and operation, based on information received from the receiving terminal and the post guard;
   a position recognition unit configured to track a movement path of the receiving terminal which is moving and the post guard and recognize a current position based on information received from the receiving terminal and the post guard;
   an operation instruction management unit configured to receive an operation instruction event through a web interface and perform monitoring for status recognition of a relevant operation and synchronization with database using information recognized by the status recognition unit and the position recognition unit;
   a TCP/IP server configured to receive presence or absence of collision and a dangerous condition for each post guard which are input from the receiving terminal via TCP/IP communication, or transfer the presence or absence of collision and the dangerous condition for each post guard which is monitored by the operation instruction management unit to the receiving terminal via TCP/IP communication;
   an RI/TI management unit configured to store and manage the presence or absence of collision and the dangerous condition for each post guard transferred from the TCP/IP server; and
   a web interface configured to display, on a screen of the management server, the presence or absence of collision and the dangerous condition for each post guard transferred from the TCP/IP server, and receive an operation instruction event from a manager.

6. The post guard integrated management system of claim 1, further comprising a receiving terminal configured to receive the information transmitted from the post guard, display presence or absence of collision with the post guard and the dangerous condition on a logistics warehouse map, transfer the presence or absence of collision with the post guard and the dangerous condition to the management server, and have a post guard integrated management application installed therein to provide the information transmitted from the post guard.

7. The post guard integrated management system of claim 6, comprises:
   a Bluetooth Low Energy (BLE) connection management unit configured to connect the post guard using a Bluetooth BLE profile, check whether status information is uploaded to a relevant wireless communication module, and output a result of checking to a program;
   a upload management unit configured to receive an event through a user interface and upload status information registered in the wireless communication module connected thereto through the BLE connection management unit;
   a register management unit configured to register or delete post guard information based on information input via the user interface and transfer the post guard information to a wireless communication module management unit;
   a wireless communication module management unit configured to match status information of the wireless communication module uploaded by the upload management unit with the post guard information transferred from the register management unit, and manage the presence or absence of collision and the dangerous condition for each post guard;
   a TCP/IP client configured to transfer the presence or absence of collision and the dangerous condition for each post guard, which are detected by the wireless communication module management unit, to the manager server via TCP/IP communication; and
   a user interface configured to display the presence or absence of collision and the dangerous condition for each post guard, which are detected by the wireless communication module management unit, on a screen of the receiving terminal and receive an operation instruction event from a manager.

8. A post guard integrated management method, comprising:
   (A) receiving a change in tilt and presence or absence of collision along with position information detected by an embedded sensor from a post guard installed in a pillar of a rack; and
   (B) monitoring presence or absence of collision and a dangerous condition of the rack or the post guard based on the transmitted presence or absence of collision and dangerous condition of the rack or the post guard and provide detected status information of all post guards to a plurality of receiving terminals,
   wherein the step (B) further comprises, there is movement of the post guard, analyzing and tracking a movement path of the post guard based on a change in a Received Signal Strength Indicator (RSSI) of a receiving terminal and position information of the receiving terminal which are caused by movement of the post guard.

9. The post guard integrated management method of claim 8, wherein the step (A) further comprises transmitting information indicating whether fire occurs, detected by a fire detection sensor, in real time.

10. The post guard integrated management method of claim 8, wherein the step (A) further comprises receiving a wireless communication signal from wireless communication modules physically adjacent thereto within a receivable range through a transmitting unit, and transmitting tilt, impact, and position information input from the wireless communication modules in real time.

11. The post guard integrated management method of claim 8, further comprising receiving the information transmitted from the post guard, displaying the presence or absence of collision and dangerous condition of the post guard on a screen of a logistics warehouse map, and transferring the presence or absence of collision and dangerous condition of the post guard to the management server.

* * * * *